July 24, 1956     A. D. ANDERSON ET AL     2,756,404
FLUID TESTING APPARATUS

Filed May 15, 1952                                          4 Sheets-Sheet 1

INVENTORS
Francis P. McGowan
Alton D. Anderson &
John C. Bellamy.
By: Thiess, Olson & Mecklenburger, Attys.

July 24, 1956  A. D. ANDERSON ET AL  2,756,404
FLUID TESTING APPARATUS
Filed May 15, 1952  4 Sheets-Sheet 2
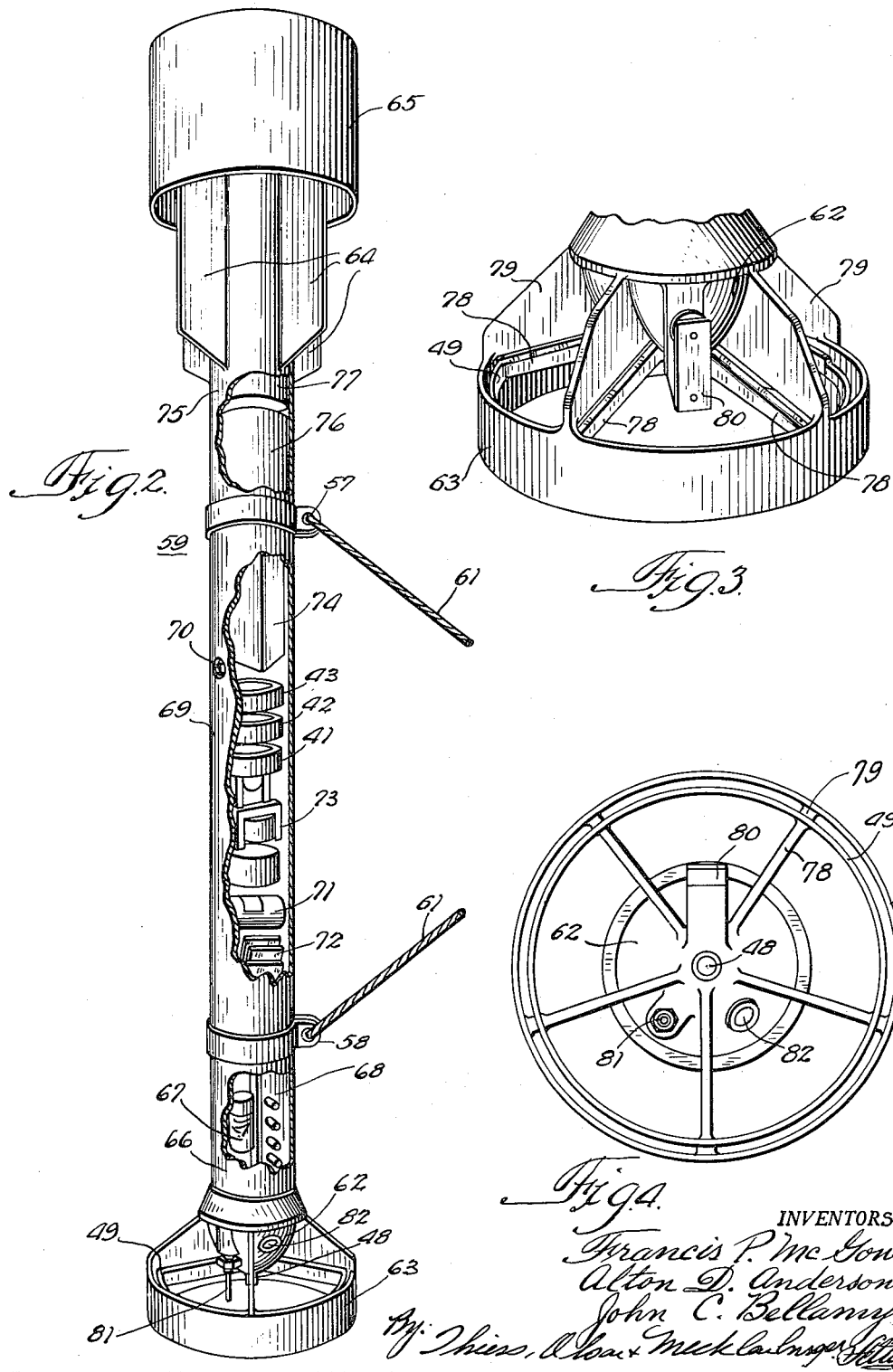
INVENTORS.
Francis P. McGowan
Alton D. Anderson &
John C. Bellamy

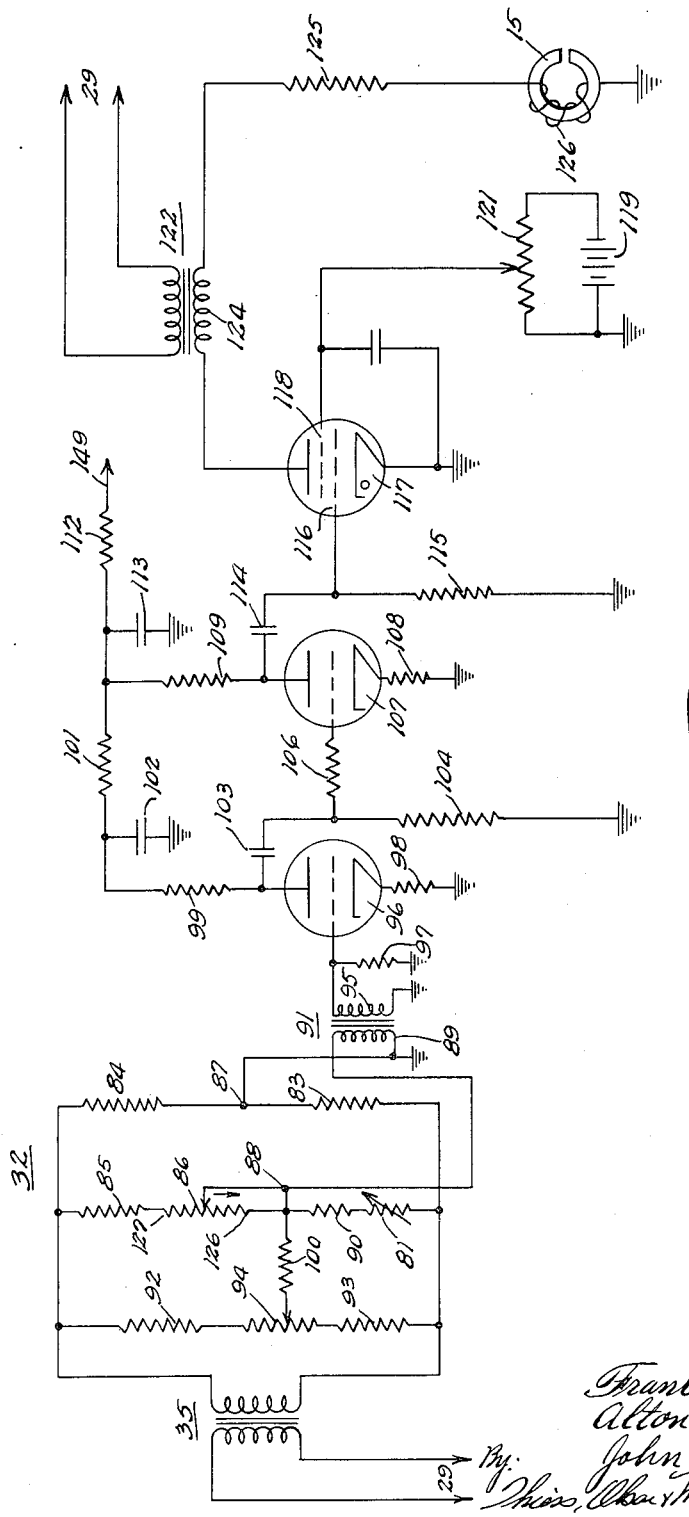

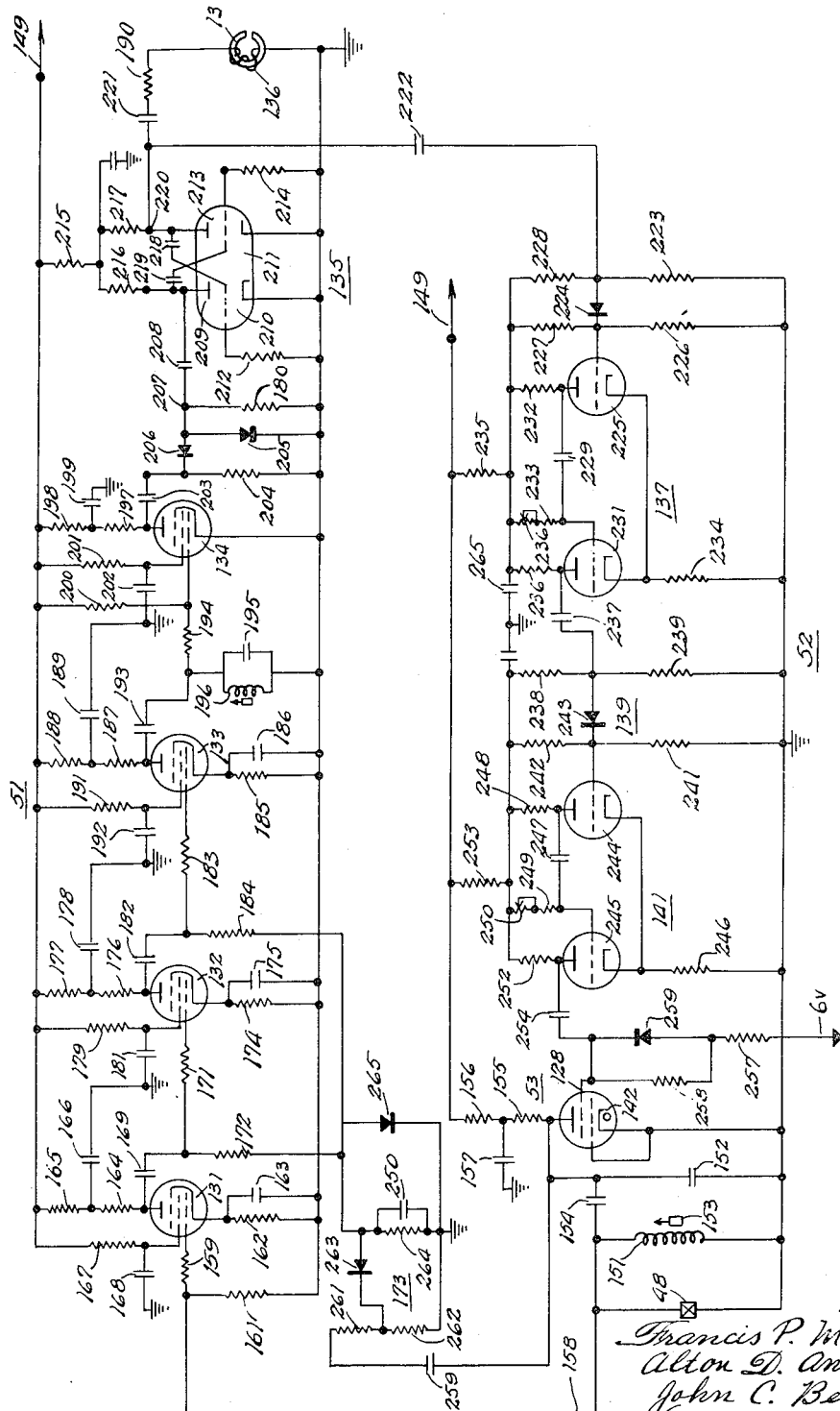

United States Patent Office 2,756,404
Patented July 24, 1956

2,756,404

FLUID TESTING APPARATUS

Alton D. Anderson, Skokie, John C. Bellamy, Barrington, and Francis P. McGowan, Lake Zurich, Ill., assignors to Cook Electric Company, Chicago, Ill., a corporation of Illinois Application May 15, 1952, Serial No. 287,914

11 Claims. (Cl. 340—5)

This invention relates to fluid testing and more particularly to the automatic measuring and recording of various physical constants at various points in a body of fluid.

It is a principal object of this invention to teach an improved method and apparatus for performing measurements of the physical constants of a fluid.

It is an additional object of this invention to provide apparatus which will automatically perform periodic measurements of various physical constants of fluids and permanently record such measurements in a form which can readily be utilized in automatic playback devices or computing machines.

Many instances arise where it is desirable to determine the physical character of a body of fluid by measuring certain of its properties at various points in the body. From this observed data, other important data can be calculated either manually or by the use of an automatic computing device. A large amount of data is accumulated in this manner, and it becomes important that it is recorded in a compact form which can readily be utilized, preferably through automatic computing methods by direct input from the record.

One operation in which such a problem of data recording arises is in oceanographic research in which it is desired to rapidly record data on the various physical properties of the sea water at various depths and in various positions.

Such factors as temperature, salinity, and the amount of entrained air are important both in navigational studies and in studies of marine life and topography. These characteristics can be measured directly, but are more readily derived from direct measurement of temperature, pressure, electrical conductivity and the velocity of sound in such a body of sea water and applying this data to the equations relating the various constants.

While oceanographic data has heretofore been compiled, it has been possible only to a limited extent and with a modicum of success. The devices heretofore known for measuring and recording seawater data have been limited to measurements of pressure, temperature, or conductivity, or combinations thereof. From this data other constants such as sound, velocity or salinity can be derived. These devices, generally termed bathythermographs, are lowered into the water to various depths and the data is transmitted through cables to the surface where charts or other permanent records are made. The prior devices are limited in the depth to which they may be lowered, the maximum pressures they can withstand, the accuracy of the results, the functionality of the record that is produced, and the physical constants which can be measured.

It is therefore a further object of this invention to provide a device which is entirely self-contained for measuring and recording fluid characteristics and adapted for use at any point in the fluid, limited only by the supporting cable of the device and its mechanical design.

An additional object of this invention is to provide an exploratory device of the type described which is entirely self-contained and includes provision therein for making a magnetic record of all measured data on a single recording tape so that the corresponding data can be readily correlated to derive additional characteristics of the fluid by the use of digital computers or the like.

Another object of this invention is to provide a device which will make a permanent coincident record of various fluid characteristics in the form of a series of discrete unitary effects, each representing a unit quantity of data, so that in playback the mere counting of these effects, as by an electronic counter, will give an arithmetically accurate determination of the measured quantities and will be especially adapted for use in automatic computing devices and the like.

It is a further object of this invention to provide a new method and apparatus which will be of increased versatility and accuracy but simple in design and construction, adapted for measurement of the velocity of pressure waves or sonic velocities in a medium.

It is an additional object of this invention to provide improved apparatus for pressure front velocity measurement whereby an impulse is introduced into a fluid and reflected within a closed loop of substantially one foot of travel whereby its travel time will be substantially the reciprocal of the sonic or pressure front velocity in feet per second whereby a record of the time at which the reflected impulse passes a predetermined point in the loop can be recorded to give an extremely accurate measure of sonic velocity.

Additional objects and advantages of the invention will become apparent from the following description, accompanying drawings and appended claims.

In carrying out the invention in one form, a measuring and recording device is provided which is capable of simultaneously recording four physical characteristics of the fluid in which it is immersed and a fifth channel is provided on which a reference signal of fixed frequency is recorded to provide a time base datum for standardization on playback to prevent error from speed variations, stretch in the recording medium or from any other possible source. In this particular embodiment, a record is made of the temperature, pressure, electrical conductivity, and sonic velocity of sea water as the apparatus is in free fall from the surface of the water to a depth of 1200 feet. The pressure, temperature and conductivity are periodically measured and recorded while the sonic velocity measurement and reference signal are continuously recorded. The rate of fall is approximately 20 feet per second, and data samples are recorded at the rate of about 3 per second, or every 7 feet of free fall. All of the intelligence is magnetically recorded on a continuous tape in the form of unitary pulses. On playback these pulses are manually or automatically counted to provide an accurate indication of the magnitudes of the various physical constants for calculation and analysis.

For a more complete understanding of this invention, reference should now be made to the accompanying drawings wherein—

Fig. 2 is an illustration in perspective of apparatus embodying this invention, with portions of its outer casing broken away to illustrate the positions of the various components within the cylinder;

Fig. 3 is an enlarged view of the ring portion of Fig. 2;

Fig. 4 is a view of the bottom of the ring portion shown in Fig. 3, illustrating the location of the various sensing elements of this device;

Fig. 5 is a schematic representation of the temperature sensing circuit shown in block form in Fig. 1; and Fig. 6 is a schematic diagram of the circuit of the sonic portions of this device.

Figure 1:
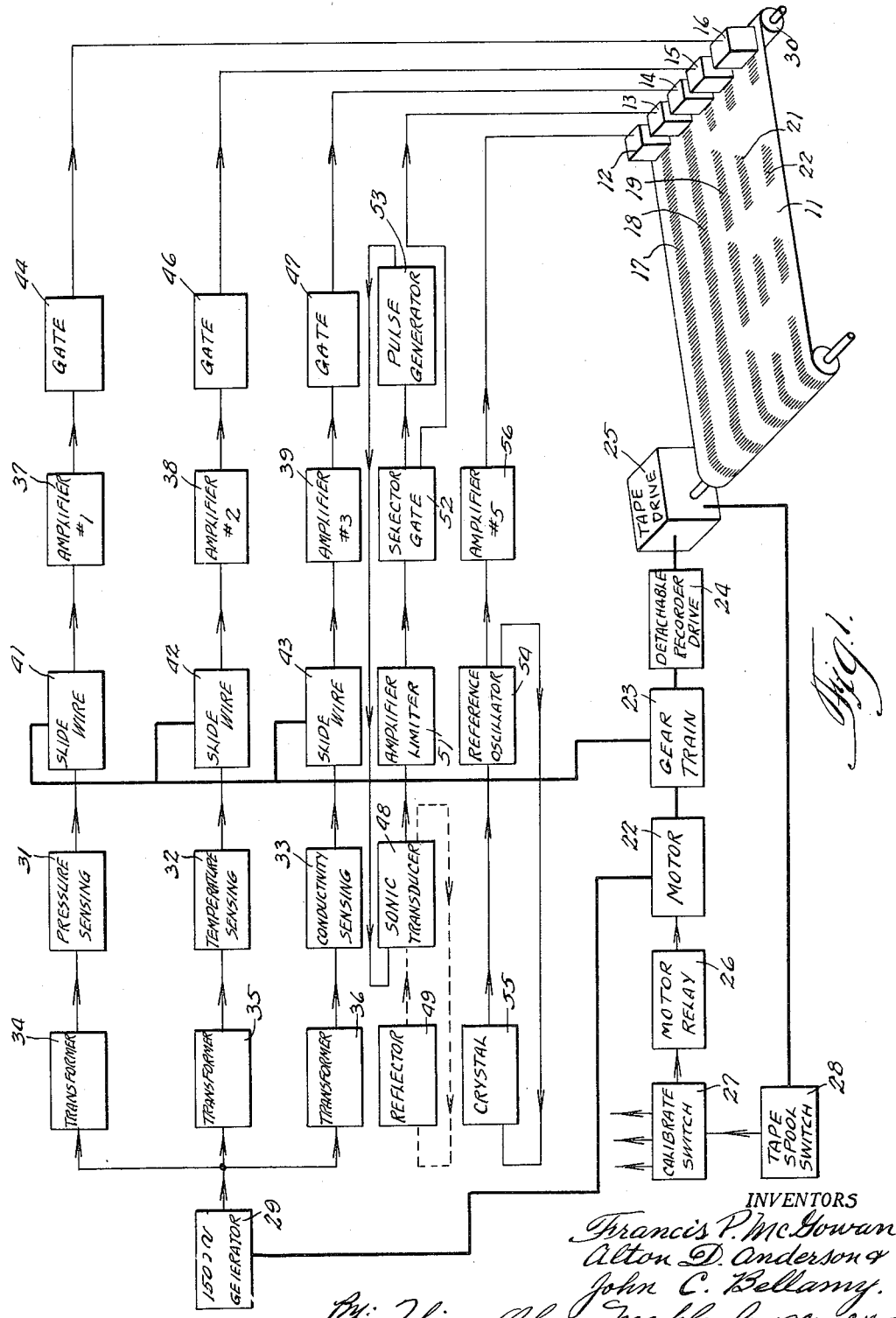
Figure 1 is a block diagram of the essential components of this device and includes a figurative representation of a portion of the record which is produced.

Referring now to the drawings and more particularly to Fig. 1, a figurative representation of the record is illustrated at 11 and shows a plurality of recording heads 12—16, each oriented in such a manner that it will, when properly energized, make a permanent magnetic record in a channel upon the recording medium 11. While, of course, a magnetic record is not visible, it has herein been illustrated as a series of visible marks in order to more clearly illustrate the manner in which this record is made.

Recording head 12 is energized by a reference oscillator and creates a record in channel 17 which is a series of magnetized effects made at uniform time intervals, and this channel is used to insure uniform playback irrespective of changes in motor speed or stretch of the recording tape as will be more fully described.

Recording head 13 is energized by the output of the sonic circuit, which will be described more fully hereinafter, and makes a discrete magnetic effect upon the recording medium each time a sonic impulse travels over a predetermined path. This is represented by the record of channel 18, and the frequency of the reference signal of channel 17 is so chosen that the records in channels 17 and 18 are of approximately the same frequency. This facilitates accurate playback and utilization of the data.

Recording head 14 is energized by the output of a conductivity measuring circuit, and periodically makes a series of effects 19, the number of effects in each single sample being determined by the magnitude of the conductivity of the water.

Recording head 15 is energized by the output of a temperature sensing circuit, and periodically generates a series of discrete magnetic effects the number of which corresponds to the temperature in degrees, Fahrenheit.

Recording head 16 is energized by a pressure sensing circuit, and periodically creates a series of discrete effects in channel 22 the number of which is determined by the pressure of the medium in which this apparatus is immersed. The number of effects corresponds to the pressure in pounds per square inch, absolute. The exact relationship of the number of effects to the data magnitude is determined by the calibration of the device.

The record medium 11 is driven past recording heads 12—16 at a substantially constant speed by motor 22 through gear train 23, detachable recorder drive 24, and tape drive 25. Motor 22 is energized from a battery source, which is not shown in Fig. 1, and is set into operation upon energization of motor relay 26 by placing calibrate switch 27 in an "operate" position, and subsequently depressing push button 70 which is the only external control which must be manipulated after sealing of the bathymeter.

Calibrate switch 27 has four positions: the first being an "off" position; the second being a "warmup" position in which filament and bias voltages are applied to the various circuits; the third being a "calibrate" position in which filament, bias and plate voltages are applied to the gate circuits of the pressure, temperature and conductivity measuring circuits to facilitate adjustment of the gate bias voltage to cut off at the proper time; and a fourth position being the "operate" position wherein filament, bias and plate voltages are applied and motor relay 26 is adapted to be energized by push button 70 to drive the tape mechanism.

Tape drive 25 has tape spool switch 28 associated therewith to automatically deenergize all relays and thus remove the various power sources from the associated loads when all of the tape has been run off of the supply spool 30.

Motor 22 also drives a 1500 cycle generator 29 which feeds the pressure sensing circuit 31, temperature sensing circuit 32, and conductivity sensing circuit 33 through transformers 34, 35 and 36. The sensing circuits generate a voltage from the 1500 cycle input 29 which is substantially proportional to the magnitude of the physical quantity being measured.

This voltage results from the unbalance of an A. C. bridge in which one leg is a variable resistance that is responsive to the characteristic being measured. To generate this voltage as desired, the variable bridge leg is a resistor having a high thermal coefficient for the temperature sensing circuit 32, the pressure sensing element in circuit 31 is a rheostat having its wiper responsive to the motion of a diaphragm under pressure, and the conductivity sensing element of circuit 33 consists of two platinum electrodes having a fixed spacial relationship in two glass tubes through which the fluid under test passes.

Another leg of these bridge circuits consists of continuously rotatable potentiometers, as will be more fully explained later. These potentiometers are continuously driven by motor 22 at a constant speed with respect to the 1500 C. P. S. generator, and the resistance limits determined thereby are so chosen that a null point of bridge balance will be traversed on each revolution irrespective of the magnitude of the constant being measured. Thus for a full revolution of the slide wire a predetermined number of cycles of the 1500 C. P. S. generator will occur, and this number, which is here 500, will be the maximum number of units that can be measured, and the reciprocal .2% will represent the approximate accuracy of the measurement. This series of voltage cycles is then applied to the appropriate gate circuit 44, 45 or 46, as will be explained subsequently, in such a manner that a series of pulses will be generated at the gate output, the number of which is a calibrated function of the physical constants of pressure, temperature or conductivity which is being measured.

The method and apparatus for sensing and recording which is used herein for the temperature, pressure, and conductivity portions of the device are substantially disclosed and claimed in the application Serial No. 165,844, filed June 2, 1950, John C. Bellamy, and assigned to the same assignee as the present invention.

Sonic velocity, which is also one of the recorded constants, is determined by the generation of a sonic pulse by a transducer 48, said pulse being transmitted into the medium in which this apparatus is immersed.

The reflector 49 is placed at a predetermined distance from transducer 48 in such a manner that a maximum portion of the energy of the sonic pulse will be reflected back to transducer 48. Upon return of the sonic pulse, transducer 48 generates a signal in amplifier-limiter 51 which is fed to multivibrator 135 and is recorded as a unitary effect by recording head 13 on the recording medium 11. Upon receipt of a predetermined number of reflected pulses at multivibrator 135, selector gate 52 transmits a trigger pulse to pulse generator 53 in such a manner that sonic transducer 48 will be energized to send out an additional sonic impulse into the medium and thus repeat the reflecting process above described.

In this embodiment the reflector is spaced substantially six inches from the sonic transducer; thus an impulse traveling from the transducer to the reflector and back has traveled a distance of one foot, and thus the number of impulses recorded in a unit of time will be substantially equal to the velocity of sound in the medium in feet per second.

To accurately measure the sonic velocity irrespective of the speed of the tape drive in playback, thus eliminating any base error, a reference oscillator 54 is provided driven by crystal 55. The output of this reference oscillator is amplified through amplifier 56 and places a series of magnetic effects in channel 17 on the recording medium. The reference oscillator is calibrated at 4096 C. P. S., which is a convenient number for use in binary playback and computing apparatus. By playing back a predetermined number of reference pulses, say 4096, and counting the number of sonic reflections in the same tape length, an extremely accurate measure of sonic velocity is obtained. The specific operation of the various circuits shown herein will be more clearly understood when discussed with respect to Figs. 5 and 6.

Fig. 2 is a view in perspective of a bathymeter incorporating this invention, with portions of its outer case cut away to diagrammatically illustrate the positioning of the various circuit elements within. Straps 57 and 58 are attached to the cylinder 59 to provide means whereby cable 61 can be attached to the bathymeter to facilitate lowering and raising the device.

The sensing elements 80, 81, and 82 and sonic transducer 48 are all located in the head portion 62. Reflector ring 49 is attached to head portion 62, and a protecting ring 63 is provided to prevent inadvertent damage to the various sensing elements and reflector ring. The device is adapted to proceed through the water with head portion 62 leading. This is insured by fins 64 and stabilizing cylinder 65 attached to the after portion of cylinder 59. Thus, head portion 62 enters water which is not yet turbulent from the passage of the device therethrough. This insures accurate results taken in relatively stagnant water.

Immediately above head portion 62 is located section 66, including the reference oscillator and crystal 67 and the sonic amplifier-limiter and pulse selector chassis 68.

Immediately above chassis 68, not shown herein, are located the amplifier chassis and limiters 37, 38 and 39 for the temperature, pressure, and conductivity measuring circuits. This portion is detachable from the remainder of the bathymeter for maintenance purposes.

Immediately above this amplifier section 66 is midsection 69, which includes the bridge circuits, gates, drive motor, dynamotor 71, alternator 72, and various controls to supply the necessary power for the entire device. Immediately above this portion are located the various control relays indicated generally as 73, and above relays 73 are slide wires 41, 42 and 43, the output of which feeds amplifiers 37, 38 and 39. These slide wires are continuously driven by the tape drive motor 22. Case 74 contains the various controls for the recording mechanism and fills the remaining portion of the midsection 69.

Tail section 75 is also detachable and is removed after each sounding run of the bathymeter. This contains recorder 76 and batteries 77 and is removed in order to utilize the data in the recorder 76 and to recharge the storage batteries contained in case 77.

The head portion will be more clearly understood from Figs. 3 and 4, which are expanded portions of Fig. 2. Fig. 3 clearly illustrates the position of the reflector ring 49 concentric with the protective ring 63 and supported from the main cylinder by fins 78. Protective ring 63 is supported by fins 79 to provide a rigid protective cover for the reflector ring 49 and the sensing elements located on the head portion 62. Conductivity sensing element 80 is the only sensing element visible in Fig. 3. Reference to Fig. 4 shows the position of conductivity sensing element 80, pressure sensing element 82 and temperature probe 81. In the center of the head portion 62 is located the sonic transducer 48. The sonic transducer is in substantially the same plane as reflector ring 49, as it was found that the maximum reflected power was utilized in such a configuration. Additional sensitivity can be gained by replacing the single radial transducer 48 with three stacked radial transducers. This configuration will cause a more concentrated output in the plane of the reflecting ring and consequently less severe attenuation of the subsequent reflected pulses. Thus all of the sensing elements are conveniently located in the head portion of the bathymeter and are substantially free from errors due to turbulence or temperature change caused by the passage of the bathymeter through the water. The sensing elements could be located elsewhere on the bathymeter, however, without departing from this invention.

Referring now to Fig. 5, the circuit used in the temperature measuring portion of the bathymeter will be described. The circuit which is used for pressure and conductivity determination is substantially the same, differing only in the sensing element which is employed and certain circuit constants associated therewith. Variable resistance 81 in Fig. 5 represents the sensing element in this temperature determining circuit and would in a like manner represent a variable resistance in which the wiper position depended on pressure when used in the pressure-sensing circuit and would consist of a measured portion of the medium being tested in the conductivity sensing portion of the bathymeter.

Sensing element 81 and fixed resistance 90 comprise one arm of an A. C. bridge circuit 32. Resistance 83 of substantially the same magnitude as the variable resistance arm 81 at its minimum value, and resistance 84 comprise the ratio arms of said bridge. Resistance 85 and slide wire 86 constitute the variable arm of the bridge circuit, and slide wire 86 is continuously varied for bridge balancing. The output of this bridge circuit is taken between points 87 and 88 and applied to the primary 89 of transformer 91. The bridge circuit is energized with a 1500 cycle signal in the customary manner in bridge practice by transformer 35 which is supplied from the 1500 cycle source 29. Resistors 92 and 93 and potentiometer 94 are included in parallel with the variable arms of the bridge circuit to provide a manual adjustment to compensate for variations in bridge characteristics which will result from changing any of the circuit elements, or from ageing or deterioration of the circuit. The desired compensating resistance is placed in the variable arms by the connection of resistor 100 from the potentiometer wiper to point 88.

The manner in which the temperature sensing circuit operates is as follows:

This device is designed to operate over a temperature range of from 28° to 90° Fahrenheit with an accuracy of better than .2° F. Thus if the temperature of the network in which probe 81 is immersed is the lower limit 28° F., the bridge is so designed that no signal is recorded by recording head 15. If the temperature is the maximum of 90° F., the bridge is so designed that the maximum number of unitary effects will be recorded upon tape 11 in the temperature channel 21. As briefly described above, slide wire 86 is mechanically connected to the motor 22 so that it will continuously rotate to cause the magnitude of resistance 86 to vary continuously from a minimum or zero to a maximum and then in a single step go to zero again. This variation will cause the bridge to go through a balance point, at which the voltage between points 87 and 88 will be zero, at some time in each rotation of the slide wire. The point at which this zero or null voltage exists will be determined by the magnitude of sensing resistor 81 which is, in turn, determined by the temperature of the medium under test. As the slide wire rotates and the voltage between points 87 and 88 goes from a maximum through the null value, the resulting grid voltage on tube 117 is in phase with the plate voltage thereon. At the null, the phase of this voltage with respect to the applied plate voltage will undergo a 180° phase inversion. At this point such signal effects applied to transformer 91 and amplified through two stages of amplification in tubes 96 and 107 will be out of phase with the plate voltage of tube 117, when applied to grid 116, and will thus not cause conduction in thyratron 117 for any slide wire position beyond the null position.

Thus if 81 is of small magnitude—that is, the temperature is approximately at its minimum value—the null position would occur when slide wire 86 had its wiper close to the beginning of its travel, indicated by point 127, and as the wiper continued to rotate, only an out of phase voltage with respect to the plate voltage would be applied to grid 116 and thus no record would be made by recording head 15.

If resistor 81 is near its maximum value—that is, the temperature of the medium is high—the bridge circuit 82 will not be balanced until the wiper of potentiometer 86 approaches its point of maximum rotation—that is, point 126. During this entire rotation, "in phase" signals will be applied to grid 116 causing conduction in thyratron 117, and consequently the maximum number of effects will be recorded by head 15.

The relationship between each effect and the temperature increment which such an effect represents is a matter of design, but it should be noted that each effect does represent a predetermined increment and thus a unitary record is generated which is extremely accurate both in the recording and in the playback. This record is especially adapted for use with any of the known computing devices which rely on a pulse input for their intelligence.

The voltage of secondary winding 95 of transformer 91 is applied to the grid of a vacuum tube 96 which is connected in an amplifier circuit. Resistor 97 provides a grid return through ground for the secondary 95. The amplifier circuit can be traced through cathode resistor 98, vacuum tube 96, and plate resistors 99 and 101. Condenser 102 is connected from the common connection of resistors 99 and 101 to ground in order to provide a by-pass path for the plate signal to prevent spurious feed back voltages in the power supply and the various other stages. The output of this amplifier is coupled to the succeeding tube 107 by an RC network consisting of condenser 103 and resistor 104. The signal is applied through grid resistor 106 to the grid of a second amplifier tube 107. The circuit of amplifying tube 107 includes cathode resistor 108 which is connected to ground and plate resistor 109 which is connected to a power supply by conductor 149 through resistor 112. Condenser 113 is again provided as a by-pass to ground to prevent feed back of the plate signals of tube 107 to the power supply 149. Cathode resistor 108 is so chosen that this tube will operate in a nonlinear portion of its characteristic curve and thus cause a periodic output in which the negative portions of the signal have a longer period of time duration than the positive portions. This will insure accurate control of tube 117 irrespective of slight phase shift in the device. This signal is then applied through a network which includes condenser 114 and resistor 115 to the control grid 116 of a grid controlled thyratron 117. The shield grid 118 of thyratron 117 has a fixed negative bias applied to it from battery source 119, and the bias voltage is controlled by the position of the wiper of potentiometer 121. The adjustment of this bias voltage by potentiometer 121 determines the firing voltage of thyratron 117.

An A. C. voltage is applied to the plate of thyratron 117 by transformer 122 which is also energized by the 1500 cycle source 29. Thus, when control grid 116 has a small positive voltage applied to it which is in phase with the plate voltage on thyratron 117, conduction will occur on each positive half-cycle of the voltage of the 1500 cycle generator 29. This will cause a current to flow in the anode circuit of thyratron 117 through secondary winding 124 of transformer 122, resistor 125, and the winding 126 of recording head 15.

Each positive half cycle which occurs while tube 117 is receiving "in phase" grid voltage will cause a magnetic effect to be permanently recorded on tape 11 by recording head 15. The total number of such effects is determined by the portion of a complete rotation of slide wire 86 which occurs before bridge 32 balances, and this in turn is a measure of the temperature of the fluid surrounding resistance 81. The exact ratio of the number of effects to the temperature is determined by the calibration of the device.

As indicated above, the pressure and conductivity circuits differ only in the sensing element employed and the associated bridge elements. In those circuits, of course, each magnetic effect represents an increment of pressure or conductivity rather than temperature.

All of the resistors employed in the temperature sensing circuit 32, the conductivity sensing circuit 33, and the pressure sensing circuit 31 are noninductively wound and of an identical, small thermal coefficient. Thus, any error that might occur as a result of changes in ambient temperature within the bathymeter will be effectively balanced out in the later comparison of temperature and pressure.

Fig. 6 is a schematic diagram of the essential portions of the sonic circuit employed in this bathymeter. The circuit consists of a free-running multivibrator 135 which acts as a trigger and feeds a pulse generator 53 through monostable multivibrators 137 and 141 to cause a voltage impulse to be impressed across a barium titanate transducer 48, which by the nature of the compound varies its physical dimensions substantially under such an electrical impulse. This causes a sonic pulse to be generated in the medium surrounding the transducer which is reflected from ring 49 and returns to the transducer as described above.

The returning sonic pulse generates an electrical voltage in transducer 48 which is applied to the amplifier 51 of Fig. 6 consisting of tubes 131, 132, 133 and 134 and their associated circuit elements. This amplified voltage is then applied to the free-running multivibrator 135 which will be locked-in by said voltage pulse and will generate a single current pulse in the coil 136 of recording head 13. These recording pulses which are generated by the reflected waves are also applied to a selector gate 52 which includes a monostable multivibrator 137 which has a normal period of slightly greater than three times the total time required for a given transmitted pulse to return to transducer 48. Thus the output of multivibrator 137 will have a normal repetition rate of substantially one-third that of multivibrator 135. This output is fed through a network 139 to a second monostable multivibrator 141 which has normal period slightly greater than three times the total period of a pulse received from multivibrator 137. Thus the output of multivibrator 141 is "locked-in" by the signal from multivibrator 137 and has a frequency of precisely one-ninth the frequency of the input to the multivibrator 137, which is the frequency of reflected pulses. This signal will then be applied to the grid of the gas tube in the pulse generator circuit 53 to maintain a periodic output pulse to transducer 48 which is substantially one-ninth of the sonic velocity in feet per second.

The sonic circuit will here be described in greater detail. Multivibrator 135 is of the free-running type, that is, it does not require a signal to trigger it but will oscillate at a frequency determined by its components. This multivibrator then transmits a signal through condenser 222 to the monostable multivibrator 137 which, as indicated above, selects every third impulse from multivibrator 135 and energizes multivibrator 141 therewith. Multivibrator 141, in turn, has a period such that it responds only to every third impulse from multivibrator 137, and this impulse is applied to the grid 128 of the sonic generator 53. Grid 128 is normally biased by a −6 volt source through resistors 257 and 258. Semiconductor 259 is connected in parallel with resistor 258 to provide a by-pass for the negative half cycle of the output of multivibrator 141 so that only the positive output pulses are applied thereto.

When a positive voltage is applied to the grid of tube 142, the tube begins conducting and an output pulse is applied from the plate of tube 142 across the barium titanate transducer 48 which is in parallel with a coil 151 and a condenser 152. Coil 151 is provided with an iron slug 153 to render it tunable over a predetermined range so that coil 151 and condenser 154 will have a resonant frequency which is approximately the same as the resonant frequency of the transducer 48. This will increase the transducer output by feeding a short series of successive voltage impulses to build up maximum sonic output. Condenser 154 isolates the high voltage of source 149 but is relatively large and has little effect on the resonant circuit. Tube 142 has associated therewith in its plate circuit load resistors 155 and 156 and by-pass condenser 157 connected to the junction between these resistors to provide a by-pass to ground as described above. Thus, a series of impulses is generated and transmitted into the water to be reflected by reflector ring 49. Thyratron 142 is self-extinguishing after the initial output pulse. That is, the resistors 155 and 156 cause a large voltage drop when the tube 142 fires, and thus a voltage of such small magnitude exits across the tube that it will not remain ionized. This extinguishing is augmented by voltage feed back from the coil 151.

Upon the return of a reflected pulse, transducer 48 will generate a small electrical pulse which is applied through conductor 158 and resistor 159 to the grid of amplifying tube 131. The grid of tube 131 is connected to ground through resistor 161, and the cathode of tube 131 has a network consisting of resistor 162 and condenser 163 which provides cathode bias. The plate circuit of tube 131 includes load resistors 164, 165 and by-pass condenser 166. The screen grid is connected to source 149 through resistor 167, and is also provided with a by-pass condenser 168. The output of this amplifier is fed through coupling condenser 169 to tube 132 through grid resistor 171, and the grid of tube 132 is connected to ground through resistor 172 and network 173. Network 173 is an automatic biasing network which will be described later. Tube 132 has associated therewith in its cathode circuit resistor 174 and condenser 175 which provide cathode bias and, as described with respect to tube 131, has in its plate circuit resistors 176 and 177 and condenser 178, and its screen grid circuit includes resistor 179 which is connected to source 149 and by-pass condenser 181.

The output of tube 132 is taken at its anode through coupling condenser 182 and is applied to the control grid of tube 133 through grid resistor 183. The grid of tube 133 is also coupled to ground through resistor 184 and network 173. Tube 133 is also in an amplifier circuit and has in its cathode circuit resistor 185 and condenser 186. In its plate circuit are load resistors 187 and 188 and by-pass condenser 189, as above, and the screen grid of tube 133 is connected to source 149 through resistor 191 and has by-pass condenser 192 coupled to ground. The output of tube 133 is taken at its anode through coupling condenser 193 and applied through grid resistor 194 to the control grid of tube 134. Resistors 194 and 200 provide grid bias for the tube 134, and the grid of tube 134 is connected to ground through the network consisting of condenser 195 and coil 196 which has an iron slug adjustable for frequency determination. This network is turned to eliminate spurious harmonics and other noise signals which are generated in the system. Tube 134 serves as an amplifier and has associated therewith plate resistors 197 and 198 and by-pass condenser 199. Resistor 201 connects the screen grid to the source 149 and is provided with by-pass condenser 202.

The output of tube 134 is taken at its anode and applied through coupling condenser 203 to a network consisting of resistors 180 and 204 and semiconductors 205 and 206. This network will eliminate the positive half cycle of the output of tube 134 which will appear entirely across resistor 204 but will pass the negative half cycle of said signal through semiconductor 206 to appear as a voltage on resistor 180. Semiconductor 205 provides a by-pass for any positive voltages which might appear at point 207 resulting from feed back from multivibrator 135. The negative voltage on resistor 200 is coupled through condenser 208 to the anode 209 of tube 210 which comprises one tube of the multivibrator 135.

Multivibrator 135 consists of single envelope 211 including two triode sections. Triode 210 has its grid connected to ground through resistor 212 and triode 213 has its grid connected to ground through resistor 214. The cathodes of triodes 210 and 213 are connected directly to ground and the plates are connected to a source of potential 149 through anode resistor 215. The plate of triode 210 has plate resistance 216 connected to its anode 209 and resistor 217 is connected to the anode of triode 213 and thence to the common anode resistor 215. The plate of triode 213 is coupled to the grid of triode 210 through condenser 218, and condenser 219 connects the plate of triode 210 to the grid of triode 213. This is a normal free-running multivibrator as is well understood in the art and functions generally as follows: A normal unbalance of current is assumed to exist in the two triode sections. Here assume greater current exists in triode 210. This will cause a voltage to appear across its anode coupling condenser 219 which will cause a negative voltage to appear on the opposite grid through resistor 214 and will further diminish the current flowing in the second triode 213. Such a diminution of current in the second triode will cause a positive voltage to appear at its anode and through its plate coupling condenser 218 will cause a positive grid bias and a further increase in the current in the first triode 210. This will proceed in an aggravated manner until the first triode section 210 is carrying its saturation current and the second section 213 is at cut-off. At this point the anode condenser 218 of the second triode section would begin to discharge, causing a relatively negative grid voltage on the first triode section. This then would cause increased conduction in the second section and decreased conduction in the first section, which would continue until the first section is at cut-off and the second section at full conduction. This will cause a continuous oscillation whereby a square wave voltage of alternate, large positive and negative pulses will appear at the multivibrator output 220.

Such a free-running multivibrator has a characteristic frequency at which it will normally oscillate, which is determined by the magnitude of condensers 218 and 219 and associated resistors 212, 214, 215, 216 and 217. This frequency can be "triggered" or controlled by the proper insertion of a periodic voltage. Such control is accomplished in this circuit by the coupling of the output of tube 134 to the anode 209 through condenser 208. The frequency of the multivibrator 135 is so chosen that it will always be slightly less than the frequency of pulses which will be applied through condenser 208. Thus the trigger voltage will be applied to the multivibrator a short time before conduction would normally commence and will lock-in the multivibrator at the pulse rate of the output of tube 134.

The output of the multivibrator 135 is applied to a recording head 13 through condenser 221 and resistor 190. Condenser 221 and resistor 190 are so chosen that a pulse of relatively short duration will be applied to the winding 136 of recording head 13, so that a relatively long time interval will exist between pulses. This will facilitate the sensing of pulses on playback.

The output of multivibrator 135 is also applied to the grid of a tube in monostable multivibrator 137 through condenser 222. Multivibrators 137 and 141 operate in a similar manner and the discussion of the operation of multivibrator 137 should suffice to convey an adequate understanding of both. Multivibrator 137 consists of tubes 225 and 231 which have a common cathode resistor 234. Tube 225 has a resistor 232 in its plate circuit and a condenser 229 connecting its plate to the control grid of tube 231. Tube 231 has resistor 230 in its plate and condenser 265 providing a by-pass from the common connection of resistors 230 and 232 to ground. The control grid of tube 231 is connected through a resistor 233 and rheostat 236 to the junction of resistors 230, 232 and 235 to provide a large positive bias on the grid. Resistor 235 is in turn connected to a source of positive potential 149. The input to multivibrator 137 consists of resistors 223 and 228 connected as a voltage divider having their center point connected to condenser 222, which receives the output of multivibrator 135, and also to a semiconductor 224 which will pass only the positive pulses which appear across resistor 223. These positive pulses are then applied to the control grid of tube 225 through a voltage divider consisting of resistors 226 and 227.

In the steady state condition tube 231 with its large positive bias is in a state of maximum conduction which produces a large positive voltage across resistors 234. This large positive voltage produces an effective negative bias on tube 225, causing said tube to be at cut-off and nonconducting. When a sufficient positive pulse is applied to the grid of tube 225 it will cause said tube to begin to conduct. Such conduction will cause a negative voltage to be applied to the grid of tube 231 resulting from the coupling of the anode of tube 225 through condenser 229. This negative voltage on the grid of tube 231 will cause a decrease in the current in that tube, and consequently the voltage present across resistor 234 will be diminished, creating an increased effective positive voltage on the grid of tube 225. Once such a phenomenon begins it will continue in this manner until tube 225 is at saturation and fully conducting, and tube 231 is at cut-off. At this point condenser 229 will discharge through a path consisting of resistors 232, 233 and rheostat 236. This will once again positively bias the grid of tube 231, causing it to conduct at maximum and consequently causing tube 225 to cut off.

The choice of condenser 229 and its associated resistors 232 and 233 will approximately determine the period of time necessary for one such "flip-flop" of this multivibrator. A critical control of the multivibrator period is available by adjusting rheostat 236. The period of multivibrator 137 is chosen so that it is substantially three times the normal repetition time of multivibrator 135, and the output of multivibrator 137 will thus have a frequency of precisely one-third that of the frequency of the reflected pulses which are received by the transducer 48.

Once the monostable multivibrator has begun one of its oscillations, it will not respond to the subsequent pulses from the input until it once again approaches its normal steady state condition.

The output of multivibrator 137 is applied at the multivibrator 141 through condenser 237 which is connected to the anode of tube 231. This output is applied to a network 139 identical with the network which appears at the input of multivibrator 137. Thus resistors 238, 239, 241 and 242 serve as a voltage divider, and the semiconductor rectifier 243 will provide only positive pulses of predetermined magnitude to the grid of tube 244 which is the input tube of multivibrator 141. Multivibrator 141 consists of tubes 244 and 245 having a common cathode resistor 246, and the plate of tube 244 is coupled to the grid of 245 through condenser 247. The period of this multivibrator is determined by the magnitude of condenser 247, plate resistor 248, grid resistor 249, and potentiometer 250 which can be adjusted for limited frequency control. Tube 245 has plate resistor 252 connected therewith and tubes 244 and 245 have a common plate resistor 253. The output of multivibrator 141 will have a frequency of approximately one-third that of multivibrator 137, and this is determined by the magnitude of condenser 247 and the adjustment of potentiometer 250. The output of multivibrator 141 is applied through coupling condenser 254 to the control grid of tube 142 and is coupled to a $-6$ volt bias through resistors 257 and 258 and semiconductor 259.

Thus normal operation of this circuit will commence by an initial pulse from multivibrator 135 to cause pulse generator 53 to energize transducer 48 to send out a sonic pulse into the surrounding medium. Each time the sonic pulse is reflected from reflector ring 49, it will produce an electrical pulse on the grid of tube 131 which will be amplified and applied to multivibrator 135 to produce a unitary current pulse in recording head 13. These pulses will be applied to multivibrators 137 and 141, and each time nine such pulses are recorded tube 141 will again be energized to send out an additional sonic pulse.

In order to insure accurate control of multivibrator 135 and thus make an accurate record, it is desired to maintain the output pulses of tube 134 of substantially constant magnitude, though the reflected pulses will suffer a substantially exponential attenuation. To accomplish this, network 173 is provided for automatic biasing of amplifier tubes 132 and 133. Each time tube 142 causes transducer 48 to transmit a sonic pulse, it also charges condenser 258 through condenser 259 and the voltage divider consisting of resistor 261 and 262. The voltages present across condenser 258 will then produce an automatic bias on tubes 132 and 133, and rectifier 243 will prevent discharge of condenser 258 through the voltage divider. Resistor 264 is provided to bleed condenser 258, and as the discharge rate of such an RC network is an exponential relationship, by proper choice of components it will provide substantially the conjugate of the exponential attenuation of sonic pulses and result in a substantially constant output from the amplifying section. Rectifier 265 is provided to by-pass spurious positive pulses.

The reference oscillator 54 employed in this embodiment may be any one of the common crystal controlled oscillators known in the art. The oscillator employed herein is a triode tube having its grid directly connected to a 4096 cycle quartz crystal 55 and a condenser coupled feed back loop from the plate of said triode to sustain oscillations.

The output of this oscillator 54 is condenser coupled to an amplifying circuit 56, and amplifier 56 has its output coupled to recording head 12 to generate a series of magnetic pulses for time base standardization.

Any playback device employed to interpret this record 11 necessarily includes a series of pickup heads substantially the same as recording heads 12—16. The current impulses which are generated by the passage of magnetized record medium 11 are amplified by any conventional amplifier and then applied to a binary counter or automatic computer.

Any computer which utilizes pulse input data can be adapted to derive the salinity of the sea water under test by well-known means. The equation for salinity of sea water as a function of temperature and conductivity is:

$$S = \left[ \frac{100,000}{25.661 + .73720T} - 348.87 \right] C^{1.0046}$$

where

S is salinity in parts per thousand,
T is temperature in degrees F., and
C is conductance in mhos.

As the sonic velocity in sea water will be directly related to the compressibility which is a known function of temperature, pressure, and salinity, a theoretical determination of sonic velocity can be made.

It is concluded that the primary cause of a discrepancy between this theoretical and the measured sonic velocity will be the result of entrained air, and the amount of such entrained air can be determined by a comparison of the theoretical and measured values. All of these operations can be performed automatically.

This invention thus teaches a new and improved exploratory device capable of creating a permanent record of data concerning various physical constants of a medium in which the device is immersed and is especially adaptable to oceanographic research when utilized in a bathymeter to determine the physical constant of sea water.

Without further elaboration, the foregoing will so fully explain the gist of our invention that others may, by applying current knowledge, readily adapt the same for use under varying conditions of service without eliminating certain features which may properly be said to constitute the essential items of novelty involved, which items are intended to be defined and secured to us by the following claims.

We claim:

1. Apparatus for recording data corresponding to the velocity of an impulse in a medium in which such apparatus is immersed comprising pulse generating means adapted to transmit a single impulse of electrical energy upon being signalled, transducer means to generate a pressure impulse in such a medium from the impulse of said pulse generating means, reflector means mounted in fixed spaced relationship to said transducer means whereby said medium may be disposed therebetween to cause a major portion of said pressure pulse to be reflected back to said transducer means, control means responsive to a predetermined multiple number of said reflected impulses to signal said pulse generating means to originate a single additional impulse.

2. Apparatus for recording data corresponding to the velocity of an impulse in a medium in which such apparatus is immersed comprising impulse generating means, reflector means in fixed spaced relationship with said impulse generating means to cause such an impulse to travel a closed path in such a medium between said transducer and said reflector, and means responsive to a predetermined multiple number of reflections of such an impulse to control said impulse generating means and cause a single additional impulse to be generated.

3. Apparatus for recording data corresponding to the velocity of pressure impulses in a medium in which such apparatus is immersed comprising impulse generating means, reflector means in fixed spaced relationship to said impulse generating means to cause such impulses to travel a closed path in such a medium, means responsive to a predetermined multiple number of reflections of such an impulse to control said impulse generating means and cause a single additional impulse to be generated, reference signal means for generating a periodic voltage of predetermined frequency, transducer means to convert such pressure impulses into voltage impulses, and means to simultaneously record said periodic voltage and said voltage impulses in parallel channels adapted for determination of pressure impulse velocity in such a medium whereby accurate reproduction of said pressure impulses is possible.

4. Measuring and recording apparatus for the determination of the velocity of a pressure impulse in a medium comprising impulse generating means to transmit a pressure impulse in such a medium, driving means to energize said impulse generating means, reflector means to cause a portion of said impulse to follow a closed path in such a medium between said generating means and said reflecting means, recording means adapted to make a unitary effect upon a record medium for each return of said reflected impulse to said impulse generating means, and means controlled by a plurality of reflections of said impulse to cause said driving means to energize said impulse generating means and initiate an additional impulse in said medium.

5. Measuring and recording apparatus for the determination of the velocity of a pressure impulse in a medium comprising impulse generating means to transmit a pressure impulse in such a medium, driving means to energize said impulse generating means, reflector means to cause a portion of said impulse to follow a closed path of predetermined length in such a medium between said generating means and said reflecting means, recording means to make a unitary effect upon a record medium for each return of said reflected impulse to said impulse generating means, reference means to record a series of impulses of known frequency on such a recording medium adjacent to and coincident with the recording of said recording means to provide a time standard, and means responsive to a plurality of reflections of said impulse to cause said driving means to energize said impulse generating means and initiate an additional impulse in said medium.

6. Measuring and recording apparatus for the determination of the velocity of a pressure impulse in a medium comprising impulse generating means to transmit a pressure impulse in such a medium, driving means to energize said impulse generating means, reflector means to cause a portion of said impulse to follow a closed path of unit length in such a medium between said generating means and said reflecting means, a record medium, recording means to make a unitary effect upon said record medium for each return of said reflected impulse to said impulse generating means, reference means to record a series of impulses of known frequency on such a recording medium adjacent to and coincident with said recording means to provide a time standard, and means responsive to a plurality of reflections of said impulse to cause said driving means to energize said impulse generating means and initiate an additional impulse in said medium.

7. Measuring and recording apparatus for the determination of the velocity of a pressure impulse in a medium comprising impulse generating means to transmit a pressure impulse in such a medium, driving means to energize said impulse generating means, reflector means to cause a portion of said impulse to follow a closed path one foot in length in such a medium between said generating means and said reflecting means, a record medium, recording means to make a unitary effect upon said record medium for each return of said reflected impulse to said impulse generating means, reference means to record a series of impulses of known frequency on such a recording medium adjacent to and coincident with said recording means to provide a time standard for direct measurement of velocity in feet per second, and means responsive to a plurality of reflections of said impulse to cause said driving means to energize said impulse generating means and initiate an additional impulse in said medium.

8. Apparatus for recording data corresponding to the velocity of pressure impulses in a medium in which such apparatus is immersed comprising impulse generating means, reflector means in spaced relationship to said impulse generating means to cause such impulses to travel a closed path in such a medium between said impulse generating means and said reflecting means, variable gain amplifier means to produce successive voltage pulses of constant amplitude for successive reflected impulses of exponentially decaying amplitude, means responsive to a plurality of said voltage pulses to control said impulse generating means and cause a single additional impulse to be generated, reference signal means for generating a periodic voltage of predetermined frequency, and means to simultaneously record said periodic voltage and said voltage pulses in parallel channels adapted for determination of pressure impulse velocity in such a medium whereby accurate reproduction of said pressure impulses is possible.

9. Apparatus for recording data corresponding to the velocity of an impulse in a medium in which such apparatus is immersed comprising an elongate body portion, body directing means at one end of said body to effect longitudinal motion of said body through such medium, transducer means mounted at the forward end of said body means to transmit a pressure impulse into such medium, impulse generating means to energize said transducer means, impulse responsive means energized from said transducer means, means to actuate said impulse generating means controlled by the arrival of a predetermined number of reflective impulses in said impulse responsive means and reflecting means mounted on said body and providing a substantial area in fixed transverse spaced relationship to said transducer means to reflect impulses from said transducer means back to said transducer means.

10. Apparatus for recording data corresponding to the velocity of an impulse in a medium in which such apparatus is immersed comprising an elongate body portion, body directing means at one end of said body to effect longitudinal motion of said body through such medium, transducer means mounted at the forward end of said body means to transmit a transverse pressure impulse into such medium, impulse generating means in said body portion connected to said transducer means, impulse responsive means energized from reflected impulses arriving at said transducer means and reflecting means mounted on said body, said reflecting means comprising an annular ring, the inner circumference of which is in accurately spaced transverse uniform fixed relationship to said transducer.

11. Apparatus for recording data corresponding to the velocity of pressure impulses in a medium in which such apparatus is immersed comprising impulse generating means, reflector means in spaced relationship to said impulse generating means to cause such impulses to travel a closed path in such a medium between said impulse generating means and said reflecting means, variable gain amplifier means to produce successive voltage pulses of constant amplitude for successive reflected impulses of exponentially decaying amplitude, and means responsive to a plurality of said voltage pulses to control said impulse generating means and cause a single additional impulse to be generated.

References Cited in the file of this patent

UNITED STATES PATENTS

| | | |
|---|---|---|
| 2,083,344 | Newhouse et al. | June 8, 1937 |
| 2,190,141 | Walker | Feb. 13, 1940 |
| 2,280,226 | Firestone | Apr. 21, 1942 |
| 2,283,429 | Ennis | May 19, 1942 |
| 2,547,875 | Krasnow | Apr. 3, 1951 |
| 2,549,022 | Shenk et al. | Apr. 17, 1951 |
| 2,588,748 | Niles | Mar. 11, 1952 |
| 2,596,023 | Gable | May 6, 1952 |

FOREIGN PATENTS

| | | |
|---|---|---|
| 998,262 | France | Sept. 19, 1951 |